United States Patent Office

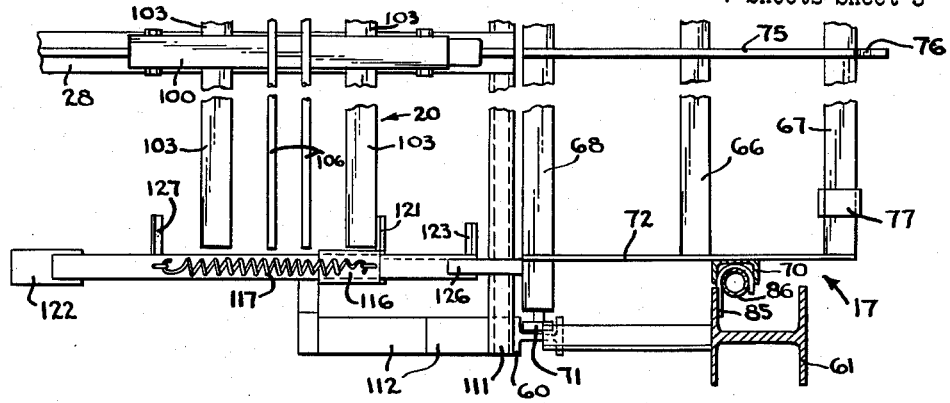
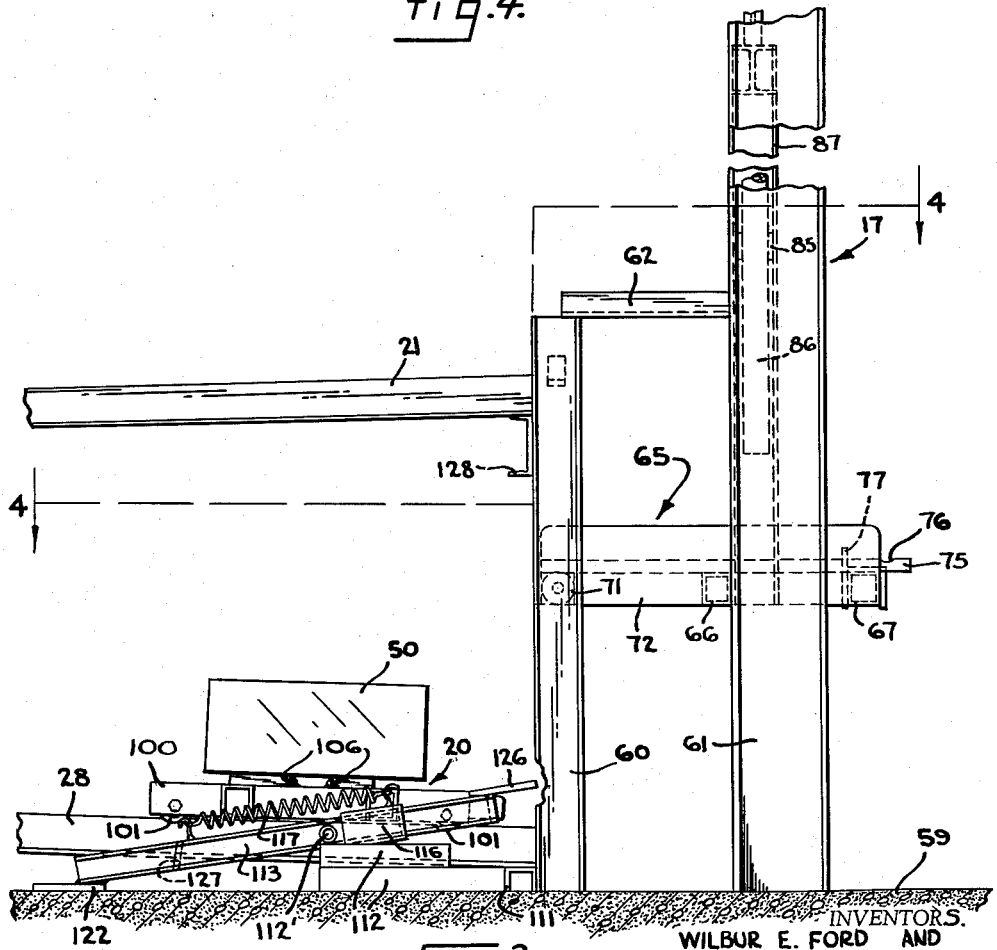

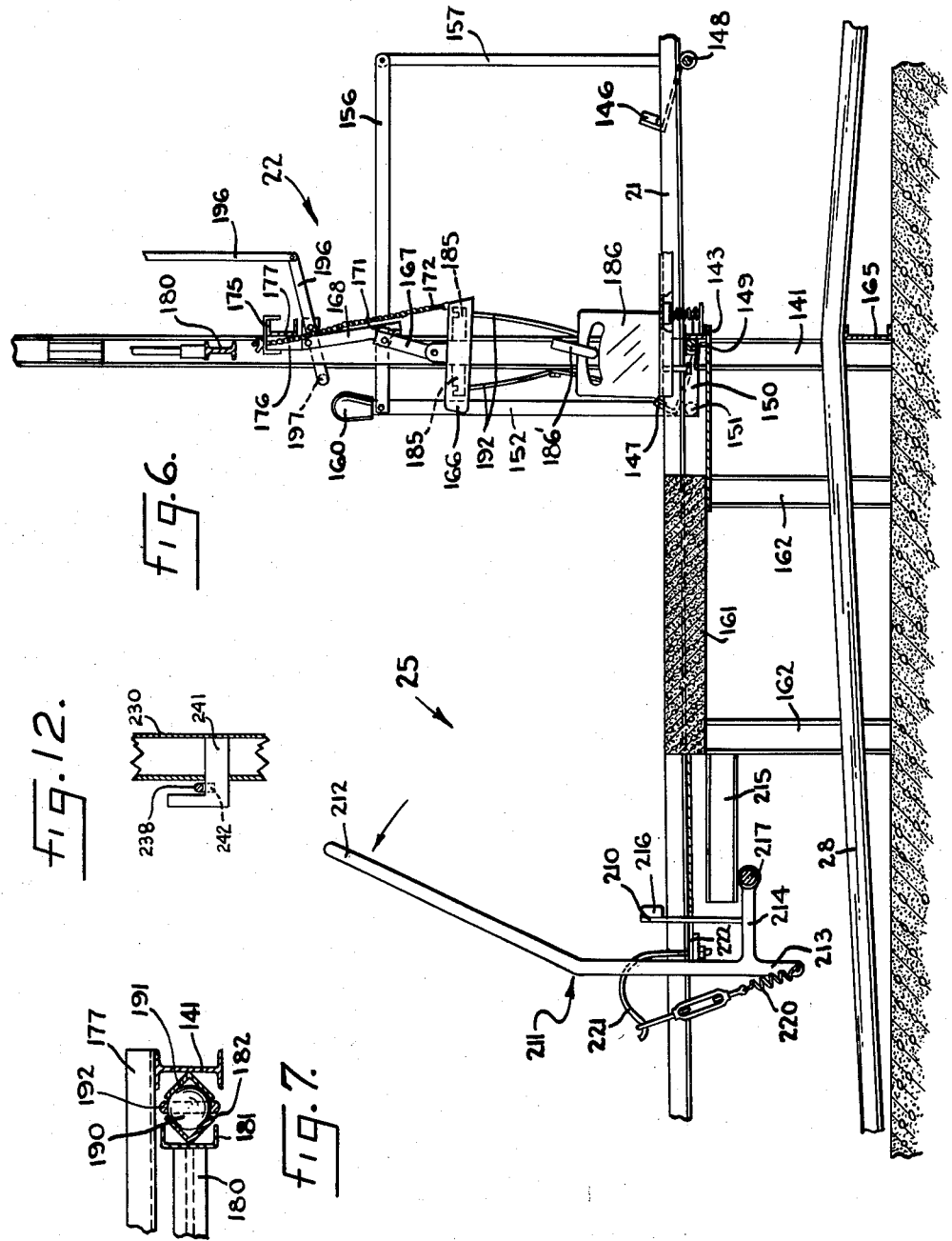

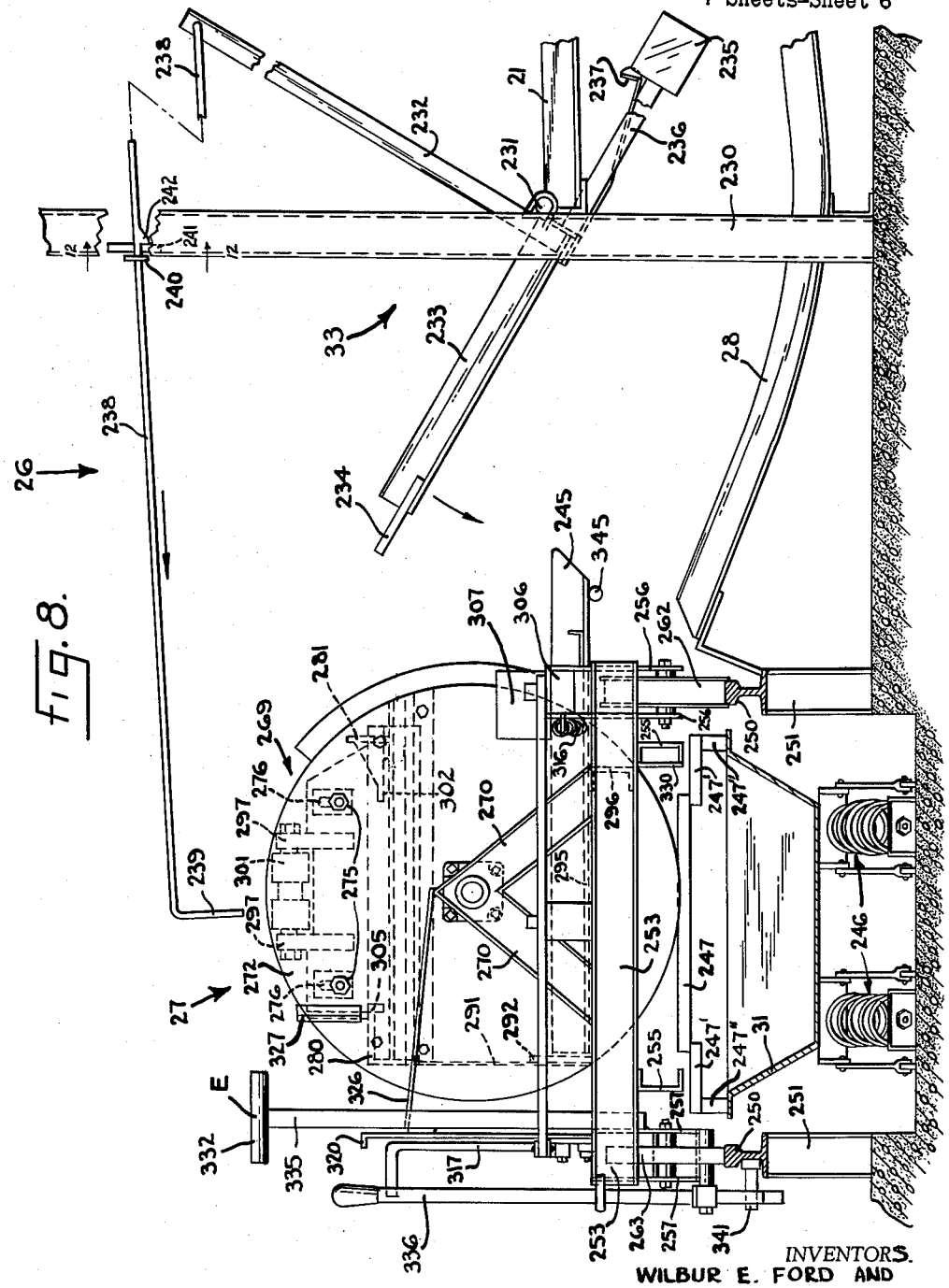

2,983,970
Patented May 16, 1961

---

2,983,970

MOLD FLASK HANDLING SYSTEM AND COMPONENTS THEREOF

Wilbur E. Ford and Harry C. Hawley, Wabash, Ind., assignors to The Ford Meter Box Company, Inc., Wabash, Ind., a corporation of Indiana Filed Aug. 4, 1958, Ser. No. 752,755

4 Claims. (Cl. 22—20)

This invention relates to a mold flask handling system for use in a foundry and also relates to certain subcombinations thereof, namely, improved apparatus for use in pouring of molds and improved apparatus for removing the contents of mold flasks.

It is an object of the present invention to provide an improved mold flask handling system.

A further object of the present invention is to provide a mold flask handling system in which the mold flasks are moved upon cars traveling along trackways.

It is a further object of the present invention to provide apparatus which removes the contents of open-topped mold flasks by a shaking of the mold flasks in an inverted position.

Another object of the invention is to provide improved apparatus for holding down the sand in a mold flask against displacement by the material being cast.

Still further objects of the present invention will become apparent from a reading of the detailed description below.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 3 is a fragmentary side elevation of the elevator of Fig. 2;

Fig. 4 is a fragmentary section taken in the direction of the arrows and along the lines 4—4 of Fig. 3 and showing the car in the same operating position as Figs. 2 and 3 but with the mold flasks removed for clarity of illustration;

Fig. 6 is a section taken in the direction of the arrows and along the lines 6—6 of Fig. 5, showing the certain elements of Fig. 5 and additionally showing one of a plurality of cooling and scraping stations forming a component of the system of Fig. 1;

Fig. 7 is a horizontal section taken in the direction of the arrows and along the lines 7—7 of Fig. 5;

Fig. 8 is a side elevation of one of a plurality of shake out stations, which forms a component of the system of Fig. 1 and shows additionally a shake out device for shaking out the contents of mold flasks;

Fig. 12 is a fragmentary section taken substantially on the line 12—12 of Fig. 8.

Figure 1:
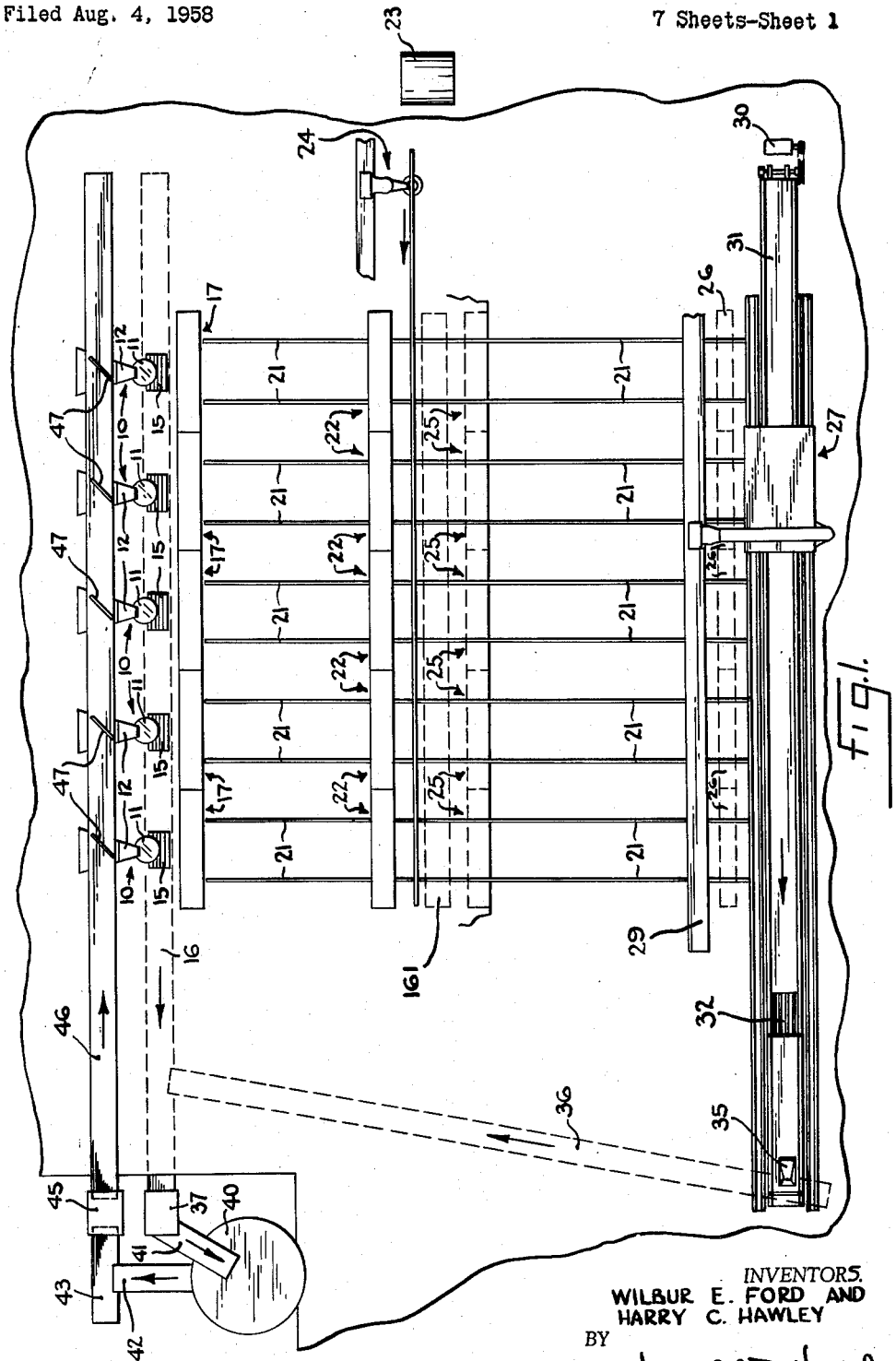
Fig. 1 is a somewhat schematic plan view of a mold flask handling system, incorporating the elements of our invention.

Referring now to the drawings, and more particularly to Fig. 1, a mold flask handling system is depicted for handling mold flasks of the type in which sand is used to form the mold therein. As is well known in the foundry art, the molds are made by placing patterns in boxes made for the purpose which are called mold flasks and by pounding damp molder's sand around the patterns. The mold flasks are usually made in two sections, so that the patterns can be removed by separating the sections; and are also made with an open top so that a small opening may be made in the sand for pouring molten metal into the mold.

The foundryman practices his art of preparing the mold within a flask at one of a plurality of packing stations 10—10 each of which has a work bench 11 for that purpose. At each of the packing stations 10—10, a chute 12 extends downwardly over the work bench 11 and may be used to convey sand to a mold flask being prepared. Each packing station has a grate 15 for receiving any spillage of sand, and conveyor 16 conveys the excess sand away from the packing stations.

Figure 2:
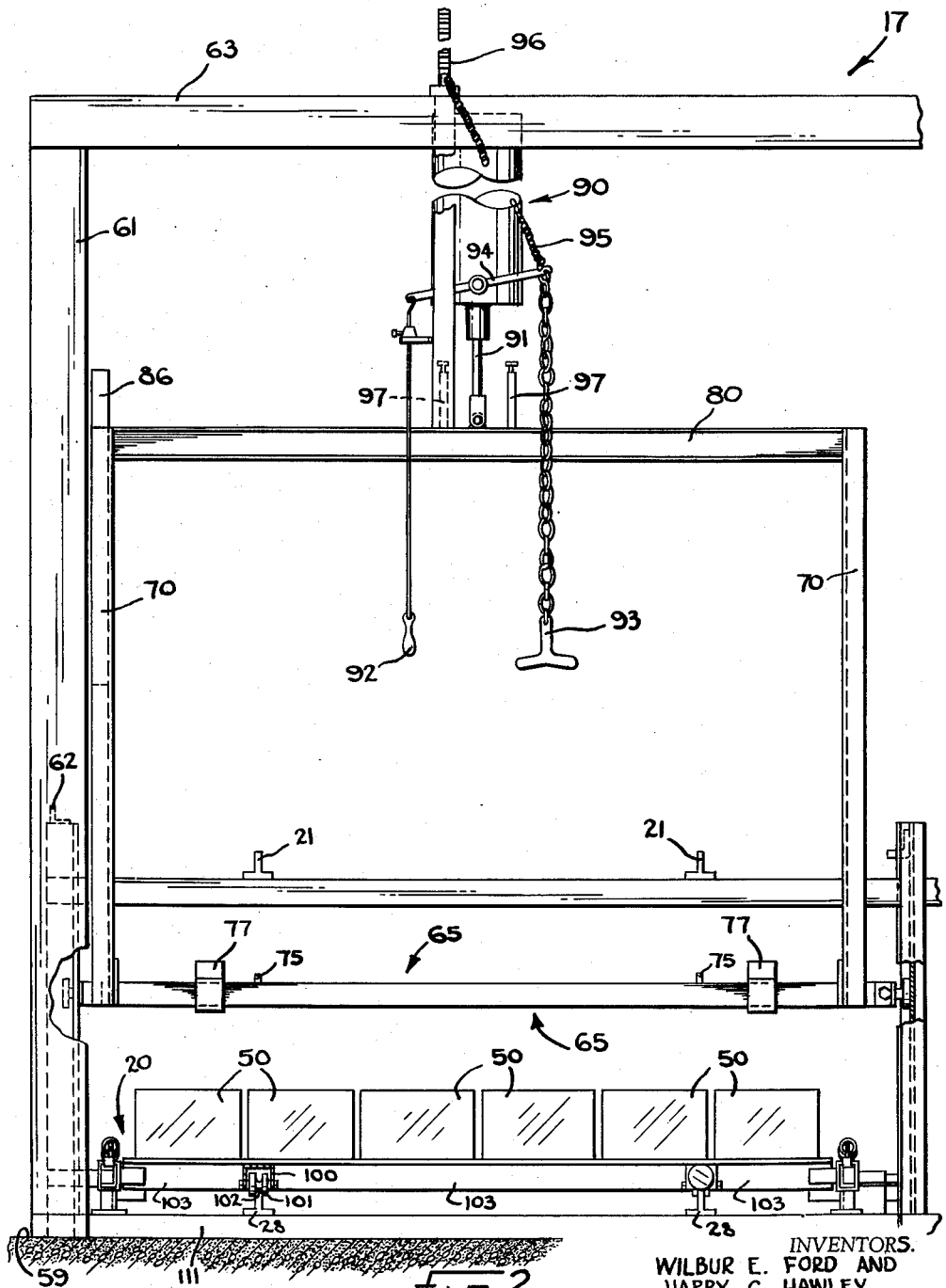
Fig. 2 is a fragmentary front elevation of one of a plurality of packing station elevators, which form components of the system of Fig. 1, showing a car, with mold flasks thereon, in an operating position adjacent the elevator.

After the operator at a particular packing station 10 has prepared a mold flask for pouring, he places it upon one of a plurality of mold flask carrying cars 20—20 (Fig. 2) which particular car 20 is carried by an elevator, indicated generally by the numeral 17, each packing station 10 being provided with such an elevator. The operator will have caused the elevator 17 to raise the car 20 to a height convenient for the operator to place prepared mold flasks thereon. After the operator has completely loaded the car 20 with prepared mold flasks, he operates the elevator 17 to raise the car 20 to the tracks 21—21. Each set of tracks 21—21 slopes downwardly toward one of a plurality of pouring stations 22—22. The details of a representative one of the elevators 17—17 are shown in Figs. 2, 3 and 4 and are explained below.

Figure 5:
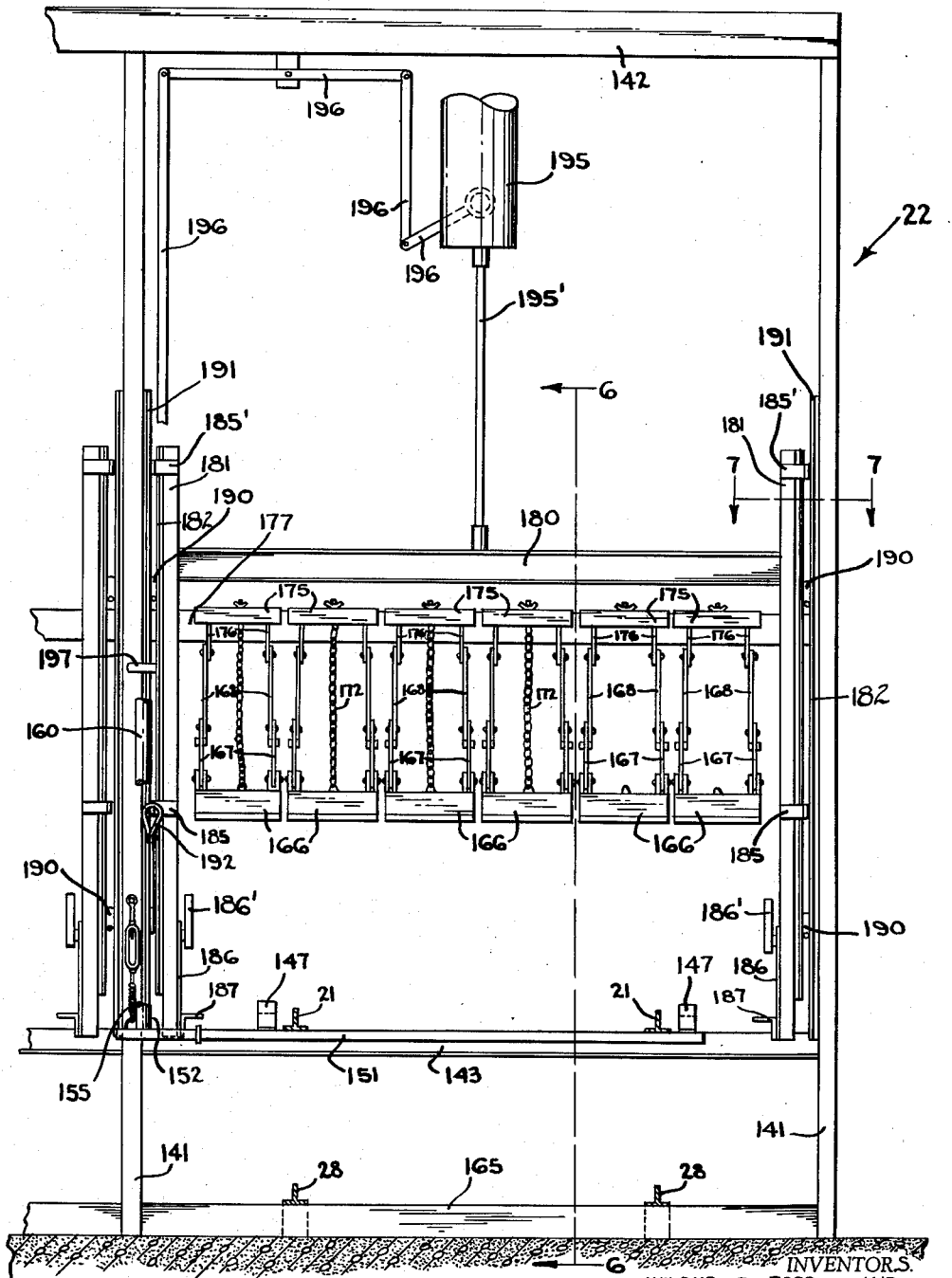
Fig. 5 is a rear elevation of certain elements at one of a plurality of pouring stations, which form further components of the mold flask handling system of Fig. 1.
Figure 9:
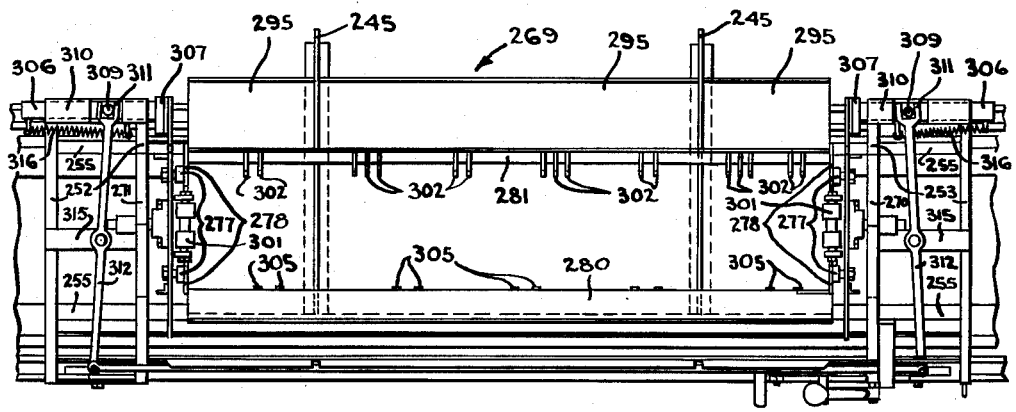
Fig. 9 is a plan view of the shake out device which is usable at each of the shake out stations, one of which is shown in Fig. 8.
Figure 10:
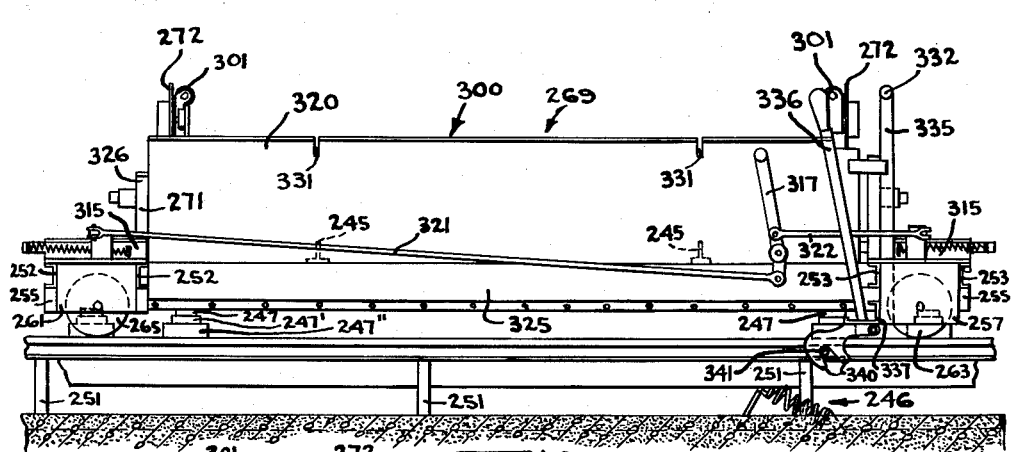
Fig. 10 is a rear elevation of the shake out device of Fig. 8 showing a trackway along which the device is movable to any of the shake out stations of Fig. 8.

The loaded car 20 travels down the tracks 21—21 until it reaches its respective pouring station 22. Each pouring station is provided with suitable means for holding down the sand in the mold against the upward force of the metal within the mold during pouring. Metal to be cast is prepared by heating in a furnace 23 and is poured into the molds by suitable pouring means, such as a travelling ladle, indicated generally by the numeral 24. The details of a respective one of the pouring stations are shown in Figs. 5, 6 and 7 and will be explained below.

After the pouring of the molds carried by a car 20, the car is allowed to pass along the tracks 21—21 to a cooling and scraping station 25 (Fig. 6), one of which is provided for each of the pouring stations 22—22. At this station, an operator removes any excess metal remaining upon the tops of the molds, and the castings are also allowed to cool. After the molds have been allowed to cool and have been scraped, the cars by which they are carried are allowed to pass on the tracks 21—21 to shake out stations, indicated generally by the numeral 26—26, one of which is provided at the end of each set of tracks 21—21 (see Fig. 8) and each of which includes a shake out stop 33.

A shake out device 27 is movable transversely of the tracks 21—21 and functions to receive the cars 20—20 with mold flasks thereon, to rotate the cars and flasks to an inverted position, and to shake out the sand and casting contents of those flasks. After the flasks have been emptied of their contents, the shake out device 27 may be operated to allow the cars to return to the packing stations 10—10 along tracks 28—28 (see Figs. 3, 6 and 8) which are arranged directly below the tracks 21—21. The construction of the shake out device 27 is depicted in detail in Figs. 8, 9, 10 and 11 and its construction and operation will be explained in detail below. During the operation of the shake out device 27, a certain amount of dust and fumes are produced. A ventilator 29 of the type described in patent application, Serial No. 703,727 filed in the name of Harry C. Hawley on January 10, 1958, now Patent No. 2,923,227, functions to carry off such dust and fumes.

Power for the shake out device 27 is provided from power means 30 which also provides power to vibrate a conveyor trough 31, thus moving the sand and castings from the shake out device 27 leftwardly, as viewed in Fig. 1, to a grate 32 which separates the castings and larger lumps of sand from the finer particles of sand. The castings are removed from the conveyor trough 31 at this point and the sand is allowed to move on until it enters a chute 35 and passes to a conveyor 36.

The conveyor 36 empties onto the conveyor belt 16 which is carrying excess sand from the packing stations 10—10. The conveyor belt 16 carries the sand to an elevator 37 where it is raised to a conveyor 41 to be transported to a mixer 40 where it is prepared for further use at the packing stations 10—10. After mixing at the mixer 40, the sand is carried by means of a discharge belt 42 to a chute 43 and is lifted by an elevator 45 to be deposited upon a conveyor belt 46. The operator at each of the packing stations 10—10 receives sand for use at his particular station by operation of one of a plurality of conventional, automatically operated, deflecting means 47—47 which function to deflect the sand being transported upon the belt 46 into the respective chute 12 at the particular packing station 10

Referring now more particularly to Figs 2, 3 and 4, the frame for a representative one of the elevators 17—17 comprises two pair of vertical I-beams 60—60 and 61—61, which are fixed to the floor 59 and are braced by a pair of angles 62—62, each of which connects one I-beam 60 to one I-beam 61. A horizontal I-beam 63 is fixed between the upper ends of the I-beams 61—61 and provides support for a fluid motor, indicated generally by the numeral 90, and a ratchet and pawl mechanism 96 used to lower and raise an elevator carriage, indicated generally by the reference numeral 65.

The elevator carriage 65 is constructed of a number of welded pairs of angles 66—66, 67—67 and 68—68 which are arranged longitudinally of the carriage 65, a pair of side pieces 72—72 fixed to and spacing the angles, and a pair of rails 75—75 which are fixed to and transversely of the angles and support one of the cars 20—20 for raising or lowering thereof The angles 68—68 have a pair of wheels 71—71 rotatably mounted at each end thereof which ride within the vertical I-beams 60—60 for guiding the elevator carriage 65 in its vertical movements. Upon the pair of angles 67—67 is slidably received a pair of stop members 77—77 which function to prevent the car 20 from rolling off the elevator carriage 65 in a rightward direction as viewed in Fig. 3.

A pair of channels 70—70 are fixed to the elevator carriage 65 at its side pieces 72—72 and have a horizontal I-beam 80 fixed to their upper ends. During vertical movement of the carriage 65, the carriage is guided by the riding of the channels 70—70 along J-shaped guide members 85—85 which are fixed to the I-beams 61—61 and which have cylindrical guide members 86—86 fixed thereto and cupped therein.

Power for lowering and raising the elevator carriage is supplied by the fluid motor 90 having a piston rod 91 pivotally secured to the horizontal I-beam 80. A hoist control 92 and a lower control 93 are both connected to a lever 94 which operates the fluid motor 90 to either raise or lower the elevator carriage 65. A chain 95 connects the lever 94 and the ratchet and pawl mechanism 96 and is effective, when the lower control 93 is pulled, to release the ratchet and pawl mechanism 96 to allow lowering of the carriage 65. A pair of adjustable stops 97—97 is fixed to the I-beam 80 and, when the elevator carriage 65 is moving upwardly, is effective to stop the carriage with its rails 75—75 aligned with the tracks 21—21.

A representative one of the cars 20—20, which is perhaps best shown in Figs. 2 and 3, includes a pair of channels 100—100 on which are rotatably mounted four wheels 101—101 formed with grooves 102—102 for preventing derailment. Fixed to the channels 100—100 and transversely thereof are two welded pairs of angles 103—103 which provide the support upon which the various mold flasks 50—50 rest. A pair of rods 106—106 are fixed to and transversely of the channels 100—100 and provide retainers, which engage portions of the mold flasks 50—50 (as shown in Fig. 3) to keep them from slipping off the car 20 during its travel over the trackways 21—21 and 28—28.

The portion of the tracks 28—28 which is adjacent the elevator 17 is supported by a channel 111 and has associated therewith means for arresting the motion of the car 20 as it moves upon the tracks 28—28 to a position adjacent the elevator 17. Along the side of each track 28 and upon blocks 112—112 is pivotally mounted at 112' an I-beam 113, the blocks 112—112 being secured to the floor 59. Each I-beam 113 has slidably received thereon a sleeve 116 which is resiliently held against the pivotal mounting of the I-beam by a tension spring 117 which is secured by one end to the slidable sleeve 116 and at the other to the pivotal I-beam 113.

A stop 121 is fixed to each sleeve 116 for engaging one of the pairs of angles 103—103 of the car 20 to stop the car, the spring 117 taking up the shock of such stopping. Secured to one end of each I-beam 113 is a weight 122 which normally maintains each I-beam in a suitable pivotal position for the stop 121 to engage and stop the car 20. A stop 123 is fixed to the rightward end of each I-beam 113 for preventing the sleeve 116 from sliding off the I-beam. Also fixed to the same end of each I-beam is a trip lever 126 which is so positioned that the angles 68—68 of the elevator carriage 65 will engage the trip lever 126, when the carriage is approaching its lowermost position, to pivot each I-beam 113 and associated stop 121 clockwise, as viewed in Fig. 3, out of the path of the car 20 so that the car 20 is free to roll onto the rails 75—75 of the elevator carriage 65.

Still further stops 127—127 are fixed to each of the I-beams 113—113 for preventing a further one of the cars 20—20 from rolling up against the particular car 20 and interfering with operation of the elevator 17. Obviously, as many cars 20—20 will be used upon a particular set of tracks 21—21 and 28—28 as are necessary to give quick efficient operation of a particular group of one packing station and its associated pouring, cooling and scraping, and shake out stations.

Assuming then that the operator has allowed a car to roll onto the rails 75—75 of the carriage 65, the car is prevented from rolling off the carriage by the stops 77—77 and the notches 76—76. The operator then operates the control 92 to raise the elevator carriage 65 to a height convenient for him to unload the empty mold flasks from the car 20 and returns them with molds therein prepared for pouring. As the carriage 65 moves away from its lowermost position, it allows the I-beams 113 to pivot in a counter-clockwise direction to their previous position as shown in Fig. 3. The stops 127—127 are thus moved out of the path of a car which they may be holding and the car is allowed to roll into engagement with the stops 121—121 to await the next cycle of the elevator 17.

After the car 20 has been filled with mold flasks prepared for pouring, the operator raises the car 20 to the level of the tracks 21—21 by again operating the hoist control 92. When the rails 75—75 are aligned with the tracks 21—21, the operator gives the car 20 a push to start the car 20 on the tracks 21—21 to the pouring stations 22—22. As can be seen in Fig. 3, the tracks 21—21 are fixed to the frame for the elevator 17 by means of a channel 128 which is fixed to and extends between the I-beams 60—60. After disposing of the car 20 the operator again lowers the carriage 65 to its lowermost position by operating the control 93 and picks up another car in the manner above-described.

Referring now to Figs. 5, 6 and 7, elements at one of the pouring stations 22—22 are shown in detail and will now be described in detail. The frame of the pouring station consists of two vertical I-beams 141—141 which are fixed to the floor and have a horizontal I-beam 142 fixed to their tops. A horizontal channel 143 is fixed to the vertical I-beams 141—141 so as to provide support for the tracks 21—21. The channel 143 is located at a level below the channel 128 (Fig. 3) which supports the entry end of the tracks 21—21, so that the tracks 21—21 slope downwardly toward the pouring station 22.

A pair of stops 146—146 is provided for preventing the cars from rolling into the pouring station when a car is already being operated upon at that station. A pair of stops 147—147 prevent a car at the pouring station from going past that station. The stops 146—146 and 147—147 are mounted upon bars 148 and 149, respectively, the first of which is pivotally mounted below the tracks 21—21 and the second of which is pivotally mounted upon the vertical I-beams 141—141. A pair of normally horizontal members 150—150 are each fixed at one end to the bar 149 at opposite ends thereof and are each pivotally attached, at their other end, to a bar 151. The bar 151 is fixed to a normally vertical member 152 (see Fig. 5) and is normally held in abutting relationship with the tracks 21—21 by a pair of adjustable tension springs 155—155 (Fig. 5) which are secured between the bar 151 and respective ones of the vertical I-beams 141—141 and which tend to hold the bar 151 and member 152 in the position of Fig. 5.

The normally vertical member 152 is pivotally attached near one end to a normally horizontal member 156 which in turn is pivotally attached to a normally vertical member 157. The member 157 is fixed to the pivotally mounted bar 148. A handle 160 is provided on the upper end of the normally vertical member 152. The operator may lower the stops 146—146 out of the path of a car by pulling the handle 160 leftwardly, as viewed in Fig. 6, pivoting the member 152 about the center of the bar 151 and also pivoting the member 157 and the stops 146—146 about the center of the bar 148. The stops 147—147 may be lowered out of the path of a car by pushing the handle 160 downwardly causing the normally horizontal members 150—150 to pivot about the center of the bar 149 and to pivot the bar 149 and stops 147—147 fixed thereon.

A concrete platform 161 is supported by vertical I-beams 162—162, extends across the system adjacent the line of pouring stations 22—22, and makes access to the pouring stations 22—22 and their controls very easy. The return tracks 28—28, which have been mentioned above, are supported by a channel 165, which is a sufficient amount larger than the channel 111 (Fig. 3) that the tracks 28—28 have sufficient slope at the elevator 17 to cause the cars to roll onto the elevator carriage 65.

Referring to Fig. 5, it can be seen that a plurality of weights 166—166 are suspended in air. Each of these weights functions as a hold down for the sand in one of the mold flasks during the pouring of the molten metal into the mold flask. Each weight may be provided with a suitable hole (not shown) through which the metal is poured. The pouring means 24 which has been mentioned above is conventional and will not be described in detail.

Each of the weights 166—166 is supported by two pairs of pivotal members 167—167 and 168—168, the links 167 being pivotally suspended from the links 168, near the lower ends thereof, and the weight being pivotally suspended from the lower ends of the links 167. The pivotal members 168—168 each have a small projection 171 which will engage the pivotal members 167 to prevent the pivotal members 167—167 and 168—168 from hanging in vertical positions or, in other words, with the three pivotal connections aligned. The purpose of the projections 171—171 is to prevent their respective weights from locking in the suspended position when the mold flasks are moved thereagainst.

The pivotal axis between each weight 166 and its respective pivotal member 167 is spaced slightly leftwardly, as viewed in Fig. 6, of the center of gravity of the weight 166 and therefore the rightward portion of each weight tends to hang downwardly. A chain or flexible link 172 is connected to the rightward portion of each weight for supporting that portion and for giving the weight a desired tilt. The other end of each chain 172 is adjustably fixed to one of a plurality of channels 175—175 and may be adjusted to lengthen or shorten the flexible link so as to change the attitude or amount of tilt of each weight in the suspended position. The channels 175—175 and a plurality of fixed members 176—176 for providing pivotal support for the members 168—168 are all fixed to a horizontal channel 177 which is fixed to the vertical I-beams 141—141 and which provides a fixed support for the weights 166—166.

The pouring station 22 is provided with an elevator for raising a car with prepared mold flasks thereon upwardly so that the mold flasks can engage the hold down weights 166—166. The elevator includes a horizontal I-beam 180, a pair of channels 181—181 fixed thereto, a pair of V-shaped members 182—182 (Fig. 7) fixed to the channels 181—181, side pieces 186—186 fixed to the channels 181—181 and angles 187—187 fixed to the side pieces 186—186. The angles 187—187 are the supports which engage the car to be lifted. As shown herein these angles are fixed at an approximately horizontal position; however, conventional means, for instance, as suggested at 186', may be provided for clamping the angles 187—187 in a tilted position for giving the car and mold flasks thereon a tilt while they are on the elevator. Such a tilt may be necessary to insure better metal flow in the molds during pouring.

When the pouring station elevator is raised or lowered, the V-shaped members 182—182 of the elevator ride upon balls 190—190 which are received between each of the V-shaped members 182—182 and respective V-shaped members 191—191, each of which is fixed to one of the vertical I-beams 141—141. The balls 190—190 are supported by ropes or cables 192—192 (only one of which is completely shown). One end of each such cable is attached to an upper holder 185 fixed to a stationary member 191, while the other end thereof is attached to a holder 185' fixed to a movable channel 181, each cable thus forming a loop or bight in which one of the balls 190 is supported. As a result of this arrangement, each such ball will move up or down with its associated channel 181, but at one-half the velocity of such channel. The power means for the pouring station elevator is a conventional fluid motor 195 which is fixed to the horizontal I-beam 142 and has its piston rod 195' fixed to the horizontal I-beam 180. The fluid motor 195 may be operated to raise the pouring station elevator upwardly or to lower it downwardly by actuating the fluid motor 195 through a series of pivoting members 196—196, pivotally mounted on I-beams 141—141 and 142, and a handle 197.

Assuming, now, that a loaded car is travelling along the downwardly sloping track 21 between the elevator 17 and the pouring station 22, the car is stopped by the stops 146—146. The operator then pulls the handle 160 leftwardly, as viewed in Fig. 6, so as to rotate the stops 146—146 downwardly out of the path of the car. The car will then roll leftwardly until it engages the stops 147—147.

The pairs of angle irons 103—103 of the car extend transversely of the direction of movement of the car a sufficient distance that they will be positioned above the angles 187—187 of the pouring station elevator when the car is engaging the stops 147—147. The operator actuates the fluid motor 195 to raise the pouring station elevator, whereby the angles 187—187 will be caused to engage the angles 103—103 to lift the car with mold flasks thereon until the mold flasks engage and lift the weights 166—166, so that the weights will be supported solely on the filled flasks. As has been mentioned above, the weights 166—166 may be set at a desired amount of tilt by adjusting the length of the chains 172—172 so that the upper surfaces of the mold flasks will not have to rotate the weights 166—166 into a proper position for holding down the sand in the mold flasks, during pouring.

The pouring is accomplished in a conventional manner by pouring through the above-mentioned holes (not shown) in the weights 166—166. After pouring, the fluid motor 195 is actuated to lower the pouring station elevator and its associated angles 187—187 downwardly until the car is resting on tracks 21—21 again. After the elevator has been lowered to its lowermost position, the operator forces the handle 160 downwardly causing the normally horizontal member 150 to pivot in a counterclockwise direction, as viewed in Fig. 6, pivoting the stops 147—147 out of the path of the car. Thereby, the car is allowed to roll leftwardly along the downwardly sloping tracks 21—21 to the cooling and scraping station 25.

At each cooling and scraping station 25 a stop 210 having a rubber cushioning portion 216 projects fixedly from a horizontal bar (not shown) which is parallel to a bar 217 and is fixed to a normally horizontal base 214 of a generally T-shaped lever, indicated generally by the numeral 211 and is also fixed to a member (not shown) parallel to the base 214 and located at the opposite end of the cooling and scraping station. The T-shaped lever 211 has an arm 213 having an adjustable tension spring 220 secured to an end thereof. The tension spring 220 is also secured to an arm 221 which is fixed to a member 222 fixed to and projecting from one of the tracks 21—21. The base 214 and the member (not shown) parallel to the member 214 are both mounted to swing about the axis of the bar 217 which is carried by a pair of horizontal I-beams 215—215 fixed to vertical I-beams 162—162.

A car traveling along the downwardly sloping tracks 21—21 from the pouring station 22 to the cooling and scraping station 25 is interrupted in its movement by the stop 210. An operator may then proceed along the concrete platform 161 to the particular cooling and scraping station 25 and scrape the excess metal from the top of the mold flasks. After the car has remained at the cooling and scraping station 25 a sufficient length of time for the castings to cool, the operator moves the arm 212 counterclockwise, as viewed in Fig. 6, until the stop 210 is lowered a sufficient distance to allow the car to pass along the downwardly sloping tracks 21—21 to one of the shake out stations 26—26 (Fig. 8). After the car leaves the cooling and scraping station 25, the operator releases the arm 212 and allows the stop to return to the position of Fig. 6 wherein it will stop another car coming from the pouring station 22.

Referring now to Fig. 8, one of the plurality of shake out stations 26—26 including a shake out stop 33 is shown in detail and will now be described in detail. Beginning with the shake out stop 33, a pair of vertical channels 230—230 has a bar 231 fixed thereto. Upon bar 231 is pivotally mounted a pair of rails 233—233 fixed with relation to one another, which may be pivoted to a position in which they are aligned with the tracks 21—21. Also fixed with relation to the rails 233—233 are arms 232 and 236. Arm 236 has a weight 235 fixed thereto which normally holds the rails 233—233 in the raised position of Fig. 8. The arm 232 has pivotally attached thereto an operating rod 238 having a handle 239, said rod resting and being guided in a bracket 241 secured to and projecting from the adjacent channel 230. Said rod is provided with a pair of longitudinally-spaced stops 240 and 242, either or both of which may be adjustable, if desired; and said stops are normally disposed on opposite sides of the bracket 241 as shown in Fig. 8, to restrain the rails 233 against movement in either direction from their illustrated positions. Thus, if a car, rolling down the tracks 21, should strike the upwardly inclined rails 233 with substantial force, the stop 242 will hold those rails against such displacement as might allow the car to roll on therepast. Stop 240 limits the degree to which the rails 233 may be moved by the counterweight 235; and it will be seen that the cammed contour of the stop 242 will permit the counterweight to move those rails in a clockwise direction until the stop 240 engages the bracket 241.

Assuming that a car has traveled from the cooling and scraping station 25 to the shake out stop 33 and has been stopped by the raised rails 233—233 and further assuming that the shake out device 27 is positioned adjacent the particular shake out stop 33 to receive the car from the shake out stop, the operator raises the handle 239 to disengage the stop 242 from the bracket 241 and pulls the rod 238 leftwardly, as viewed in Fig. 8, pivoting the rails 233—233 into alignment with the tracks 21—21 and causing a pair of stops 234—234 to engage the horizontal flanges of a pair of rails 245—245 associated with the shake out device 27, thus placing the rails 233—233 in registry with the rails 245—245 and allowing a car to roll down the rails 233—233 into the shake out device. When the rails 233—233 are in such a downward position, stop 237, fixed with relation to the rails 233—233, is raised, preventing another car from rolling onto the rails 233—233. After the operator releases the handle 239, the rails 233—233 pivot to their former raised position, the stop 242 camming over the bracket 241, the stop 237 lowers and the next car is allowed to roll along the tracks 21—21 to and against the raised rails 233—233.

As was mentioned above, a conveyor 31 is provided for moving the sand and casting contents of the mold flasks leftwardly, as viewed in Fig. 1. The conveyor 31 which is in the shape of a trough accomplishes its conveying action by a vibrating type of movement in which the conveyor is forced upwardly against the material to be conveyed at the same time that the conveyor is moving in the conveying direction and in which the conveyor drops away from the material being conveyed when the conveyor is moving opposite to the conveying direction. Such a conveyor is conventional and therefore its details will not be recited herein.

The conveyor 31 is supported by resilient pivotal supports, indicated generally by the numerals 246—246, and is powered as mentioned above by power means 30. A plurality of force transmitting members 247—247 are secured to the edges of the conveyor 31 by means of members 247'—247' and 247"—247". The force transmitting members 247—247 transmit the vibrations of the conveyor to the shake out device 27 for shaking the sand and castings out of the mold flasks in a manner later to be explained.

A plurality of vertical I-beams 251—251 are fixed to the floor and have fixed to their upper ends tracks 250—

250 upon which the shake out device 27 may be moved from one shake out station 26 to another. The shake out device 27 includes horizontal channels 252—252 and 253—253 arranged transversely of the device and fixed to longitudinal channels 255—255. The device is movable along the tracks 250—250 upon wheels 262, 263, 264 and 265 which are rotatably mounted and spaced between pairs of plates 256—256, 257—257, 260—260 and 261—261, respectively. The plates 256—256 and 257—257 are fixed between the channels 253—253 and the plates 260—260 and 261—261 are fixed between the channels 252—252. The wheels 262 and 264 have peripheral flanges at the outside edges thereof, for maintaining the wheels 262 and 264 upon rightward track 250, as viewed in Fig. 8, and, as a result of the wheels 263 and 265 being spaced a fixed distance from the wheels 262 and 264, for also maintaining the wheels 263 and 265 upon their track 250.

Figure 11:
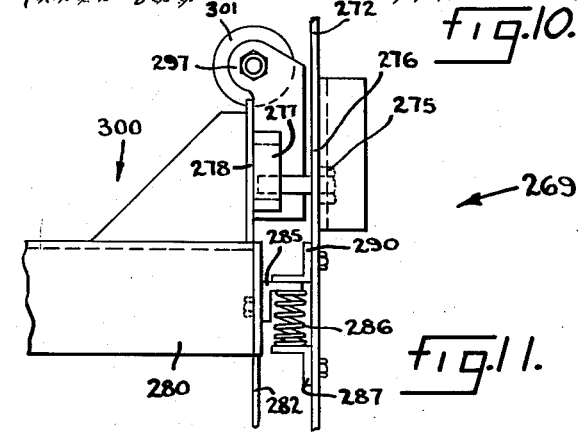
Fig. 11 is a fragmentary elevation, drawn to an enlarged scale and showing certain details of the shake out device of Figs. 8 through 10.

A pivotal carriage 269 which forms a portion of the device 27 is pivotally mounted upon two sets of supporting members 270—270 and 271—271 fixed to one of channels 253—253 and one of channels 252—252, respectively. The pivotal carriage 269 includes two circular-shaped end members 272—272 and a box-like structure or container 300 resiliently and reciprocably secured to and between the end members 272—272. Fig. 11 depicts this resilient reciprocable mounting in detail. Two pairs of projecting members 275—275 are threadably fixed to the end members 272—272 and extend into slots 276—276 in four mount blocks 277—277 fixed to the faces of two mount members 278—278.

The mount members 278—278 are positioned near each end of the box-like structure 300 and have fixed thereto angles 280 and 281 which extend the length of the box-like structure 300 between the mount members 278—278 and provide therebetween an open top for the box-like structure. Two end plates 282—282 are fixed to the opposite ends of the angles 280 and 281 and have angles 285—285 fixed to their outward faces. Four springs 286—286 are received between the angles 285 and angles 287—287 which are fixed to the circular shaped end members 272—272. The springs 286—286 resiliently hold the angles 285—285 upwardly, as viewed in Figs. 8 and 11 against a pair of angles 290—290 fixed to the circular shaped end members 272—272.

The remainder of the resiliently and reciprocably mounted box-like structure 300 includes a back plate 291 fixed to the angle 280 and to the end plates 282—282, an angle 292 fixed to the back plate 291 and to the end plates 282—282, three bottom plates 295—295, two of which are fixed to the end plates 282—282 and all of which are fixed to the angle 292, and the two rails 245—245 which are fixed to and between the three bottom plates 295—295. A further angle 296 is fixed to the base of the rails 245—245 and provides further bracing for the box-like structure 300. It will be noted that the box-like structure 300 has an open top (between angles 280 and 281) and an open front (between angle 281 and bottom plates 295—295).

Each mount member 278 has two roller mounts 297—297 fixed thereto for rotatably mounting a roller 301 therebetween. The pivotal carriage 269 can be pivoted to an inverted position in which (when the shake out device 27 is in operative position at any shake out station 26) the rollers 301—301 are just adjacent and above that station's pair of force transmitting members 247—247 which will then transmit a sharp, banging vibration to the rollers 301—301 causing the box-like structure 300 to be shaken up and down as guided by projecting members 275—275 in the slots 276—276. In this inverted position the springs 286—286 tend to resiliently hold the box-like portion 300 and associated rollers 301—301 downwardly against the force transmitting members 247—247 so that the vibrating forces are better transmitted.

The angle 281 has a plurality of fingers 302—302 fixed thereto which cooperate with projections 305—305 on angle 280 to hold the mold flasks, on one of the cars 20—20, in position in the box-like structure 300 when the pivotal carriage 269 is thus inverted. As has been mentioned above, a car 20 is allowed to enter the shake out device 27 along the rails 233—233 of the shake out stop 33, through the open front of the shake out device 27 and along the rails 245—245 of the shake out device 27. As has also been explained, the rails 245—245 are a part of the pivotal carriage 269 and of the box-like structure 300. Thus, when the pivotal carriage 269 is pivoted to an inverted position, the open tops of the mold flasks will face downwardly and will register with the open top of the box-like structure 300 so as to allow shaking out of the mold flasks through the open top of the box-like structure 300.

The rails 245—245 extend rightwardly, as viewed in Fig. 8, and normally their weight, along with the weight and positioning of the remainder of the structure of the pivotal carriage 269, is such as to overbalance the pivotal carriage 269 and to cause it to rotate, from the position of Fig. 8, in a clockwise direction so as to cause the rails 245—245 to register with the tracks 28—28. The pivotal carriage 269 is normally held in the position of Fig. 8 by means of slidable stops 306—306 engaging stops 307—307, which are fixed to the end members 272—272. Each slidable stop 306 is slidably received within a sleeve 310, one of which is fixed to the horizontal channels 252—252 and the other of which is fixed to horizontal channels 253—253, and is normally resiliently urged into the path of the stop 307 by a tension spring 316 fixed to the slidable stop 306 and to sleeve 310.

Each slidable stop 306 has a pin 309 fixed thereto and extending upwardly therefrom between the arms of bifurcated portions 311—311 of levers 312—312 which are pivotally mounted upon lever mount members 315—315, one of which is fixed to the horizontal channels 252—252 and one of which is fixed to horizontal channels 253—253. Two tension springs 316—316 are fixed between respective sleeves 310—310 and respective slidable stops 306—306 and normally urge the slidable stops into position for engaging the stops 307—307; however, the slidable stops 306—306 may be moved out of such stop engaging positions by manual counter-clockwise actuation, as viewed in Fig. 10, of a lever 317, which is pivotally mounted upon a guard plate 320, so as to move connecting members 321 and 322, which are pivotally connected to and between the lever 317 and levers 312—312, rightwardly and leftwardly, respectively. When the stops 306—306 are so withdrawn, the carriage 269 can be turned into a position in which its tracks 245—245 register with the tracks 28—28.

The guard plate 320 and a guard plate 325 (Fig. 10) are both fixed to and between one of the horizontal channels 252—252 and one of the horizontal channels 253—253, and function to protect the operator, who stands to the left of the shake out device 27, as viewed in Fig. 8, from the dust and fumes of operation as does the ventilator 29 which, for the purpose of clarity, is not shown in Fig. 8 and 11. The upper guard plate 320 is braced at each end by brace members 326—326 which are fixed to the guard plate 320 and to the supporting members 270—270 and 271—271 at their respective junctures.

The pivotal carriage 269 can be pivoted counterclockwise, as viewed in Fig. 8, until a stop member 327 engages a stop plate 330 fixed to one of the longitudinal channels 255—255. This carriage is so designed, constructed and arranged that, when a car loaded with filled flasks is received therein, the center of gravity of the loaded carriage is located between the axis of oscillation of the carriage and the open top of the carriage, regardless of the current attitude of the carriage about such axis. Thus, once the operator has manually started counterclockwise movement of the loaded carriage from its illustrated position, gravity will continue that movement until stop member 327 engages plate 330. However, when the sand and castings have been dumped from the flasks, the center of gravity of the car-loaded carriage shifts to a point which, regardless of the attitude of the carriage, is located on the side of said axis remote from said open top so that, again, when the operator manually merely starts clockwise movement of the carriage from its inverted position, gravity will continue that movement until the carriage resumes its illustrated position.

When the operator desires to move the shake out device 27 from one to another of the shake out stations 26—26, he may apply force, longitudinally of the tracks 250—250, to the handle 332 which is fixed to a rod 335, which in turn, is fixed to one of the channels 253—253 and to one of the plates 257—257. The operator may lock the shake out device 27 in place at any desired shake out station 26 by operation of a lever 336 which is pivotally mounted upon a short channel 337 (Fig. 10) fixed to the plates 257—257. The lever 336 has a fork-like portion 340 for engaging any one of a plurality of pins 341—341, each of which is so positioned that when it is engaged by the fork-like portion 340, the shake out will be positioned so that the rails 233—233 of a stop can be lowered into registry with the rails 245—245, so that the pivotal carriage 269 can be pivoted to a position in which the rails 245—245 register with the tracks 28—28, and so that the pivotal carriage 269 can be pivoted to a position wherein the box-like structure 300 will be jolted up and down by the force transmitting members 247—247.

As has been mentioned above, the tracks 28—28 are located directly below the tracks 21—21. The leftward ends of the tracks 28—28 have a slope which gives a car 20 rolling from the shake out a sufficient amount of speed to propel it to and past the portion of the tracks 28—28 over the channel 165 (Fig. 6). As has been mentioned above, the slope of the tracks 28—28 from the channel 165 to the elevator 17 is sufficient to cause the cars to stack up against the stop 121 (Fig. 4).

Assuming that a car 20 carrying mold flasks and castings which have had sufficient time to cool, is waiting at one of the shake out stations 26—26, the operator of the shake out device 27 pivots the lever 336 in a clockwise direction to release the fork-like portion 340 of the lever from the pin 341 with which it is engaged. The operator then moves the shake out device leftwardly or rightwardly by means of the handle 332 along the tracks 250 until the shake out device is positioned at the particular shake out station 26 and adjacent the particular shake out stop 33 where the particular car 20 is located. He then locks the shake out device 27 in position at the shake out stop by moving the lever 336 counter-clockwise, as viewed in Fig. 10, causing the fork-like portion 340 of the lever 36 to engage the pin 341 associated with the particular shake out station 26, thus locking the shake out device 27 in position.

The operator then grasps the handle 239 of the operating rod 238 and pulls it toward him or leftwardly, as viewed in Fig. 8, pivoting the rails 233—233 until the stops 234—234 engage the flanges of the rails 245—245. When the rails 233—233 are in such a position, they have a slope sufficiently great that the particular car at the shake out stop 33 will roll down the rails 233—233 onto the rails 245—245 and into the box-like structure 300 of the shake out device. If there is another car also waiting at the particular shake out stop 33, it will not be allowed to roll onto the rails 233—233 because of the stop 237 which will be positioned in its path. The operator then releases the handle 239 allowing the rails 233—233 to pivot upwardly and allowing the stop 237 to pivot downwardly so that the waiting car will be stopped by the rails 233—233.

The operator then pivots the pivotal carriage 269 counter-clockwise as viewed in Fig. 8, by grasping it in any convenient place and pivoting it until the stop 327 engages the stop plate 330, thus positioning the pivotal carriage 269 in an inverted position with the open top of the box-like structure 300 facing downwardly toward the conveyor trough 31. It should be noted that in moving from the position of Fig. 8 to this inverted position, the open front of the box-like container is always up, thus the car will not roll out of the box-like container 300. In the inverted position, the rollers 301 are each positioned above a respective one of the force transmitting members 247—247.

The conveyor trough 31 is vibrated by its power means 30 causing the force transmitting members 247—247 to vibrate abruptly and to transmit a banging vibration to the rollers 301—301, causing the box-like structure 300 to be bounced, shaken or reciprocated rapidly in a vertical direction, causing the casting and sand contents of the mold flasks carried within the box-like structure 300 to be shaken from the open top of the mold flasks which also will be facing downwardly toward the conveyor trough 31. The operator allows the shaking action to continue for a reasonable length of time until all of the contents of the mold flasks are deposited within the conveyor trough 31 which moves the contents leftwardly as viewed in Fig. 1 toward the grate 32 and the chute 35. The operator then grasps the handle 345 which is fixed to the flanges of the rails 245—245 and rotates the pivotal carriage 269 in a clockwise direction as viewed in Fig. 8. The operator also pivots the lever 317 in a counter-clockwise direction as viewed in Fig. 10 and against the bias of springs 316—316 until the slidable stops 306—306 are out of the paths of the stops 307—307, thus allowing the pivotal carriage 269 to continue to pivot until the rails 245—245 engage and register with the tracks 28—28.

The car 20, the contents of its mold flasks having been removed, will roll downwardly along the rails 245—245 out of the box-like container 300 onto the tracks 28—28 and will roll rightwardly as viewed in Fig. 8 until the car reaches a position near the elevator 17. The operator is still holding the lever 317, or, alternatively, again actuates the lever 317 to move the slidable stops 306—306 out of the paths of the stops 307—307 and simultaneously rotates the pivotal carriage 269 until the stops 307—307 are above the slidable stops 306—306. He then releases the lever 317 allowing the springs 316—316 to return the slidable stops to a position below the stops 307—307. Because the location of the center of gravity of the empty pivotal carriage 269 with respect to its pivots causes that carriage to rest in the position of Fig. 8, the shake out device 27 may be moved along the tracks 250—250 to the shake out station 26 at which the car carrying the next group of mold flasks to be shaken out is located.

We claim as our invention:

1. A mold flask handling system comprising a station at which sand molds are packed in mold flasks, a car for carrying such a mold flask, a pouring station, a shake out station, a first trackway for conveying said car leading from said packing station to and past said pouring station to said shake out station, an open-topped container at said shake out station for holding said car with such a mold flask thereon, a second trackway positioned below said first trackway for conveying said car from said container to said packing station, a carriage upon which said container is reciprocably mounted, said carriage being pivotal to a first position in which said container registers with said first trackway for receiving said car from said first trackway, pivotal to a second position in which said container and car are inverted and pivotal to a third position in which said container is inclined toward and registering with said second trackway for allowing said car to travel onto said second trackway, and means for joltingly reciprocating said container when inverted for shaking out contents of such a mold flask.

2. A mold flask handling system comprising a station at which sand molds are packed in mold flasks, a car for carrying such a mold flask, a pouring station, a shake out station, a first trackway for conveying said car leading from said packing station to and past said pouring station to said shake out station, a weight at said pouring station proportioned for resting upon the flask to hold down the sand therein during pouring, means for suspending said weight above said trackway, elevator means for lifting said car from said trackway to move such a mold flask carried by said car upwardly against said weight, an open-topped container at said shake out station for holding said car with such a mold flask thereon, a second trackway positioned below said first trackway for conveying said car from said container to said packing station, a carriage upon which said container is reciprocably mounted, said carriage being pivotal to a first position in which said container registers with said first trackway for receiving said car from said first trackway, pivotal to a second position in which said container and car are inverted and pivotal to a third position in which said container is inclined toward and registering with said second trackway for allowing said car to travel onto said second trackway, and means for joltingly reciprocating said container when inverted for shaking out contents of such a mold flask.

3. A mold flask handling system comprising a station at which sand molds are packed in mold flasks, a car for carrying mold flasks, a pouring station, a shake out station, a first trackway for conveying said car leading from said packing station to and past said pouring station to said shake out station, a plurality of weights at said pouring station proportioned for resting upon the flasks to hold down the sand therein during pouring, means for suspending said weights above said first trackway, elevator means for lifting said car from said trackway to move such mold flasks carried by said car upwardly against said weights, a box-like container at said shake out station having an open front for allowing said car with mold flasks thereon to pass into and out of said container and having an open top which registers with the open tops of said mold flasks when said car carrying mold flasks is in said container, a second trackway positioned below said first trackway for conveying said car away from said container to said packing station, a carriage upon which said container is resiliently mounted, said carriage being pivotal to a first position in which the open front of said container faces generally horizontally and registers with said first trackway for receiving said car from said first trackway, being pivotal through such a path that the open front of said container is always facing upwardly to a second position in which the open top of said container is facing downwardly, and being pivotal back through said path to a third position in which the open front of said container is facing downwardly toward and registering with said second trackway for allowing said car to travel onto said second trackway, and means for joltingly shaking said container, when inverted, for shaking out the contents of the mold flasks.

4. A mold flask handling system comprising a station at which sand molds are packed in open-topped mold flasks, a first trackway, a second trackway positioned below said first trackway and ending at said packing station at approximately floor height, a car for carrying mold flasks proportioned and arranged for traveling on said trackways, an elevator at said packing station for raising said car from the end of said second trackway to a given position which is at a convenient height for an operator to transfer mold flasks with molds therein to said car, a pouring station, a scraping and cooling station, a shake out station, said first trackway sloping downwardly from above said given position to and past said pouring station, to and past said cooling and scraping station and to said shake out station, a box-like container at said shake out station having an open front for allowing said car with mold flasks thereon to pass into and out of said container and having an open top which registers with the open tops of said mold flasks when said car, carrying mold flasks, is in said container, said second trackway leading from said container to said end of said second trackway, the portion of said second trackway adjacent said container being sufficiently high and sloping to cause said car to roll from that portion to said end thereof, a carriage upon which said container is resiliently mounted, said carriage being pivotal to a first position in which the open front of said container faces generally horizontally and registers with said first trackway for receiving said car from said first trackway, being pivotal through such a path that the open front of said container is always facing upwardly to a second position in which the open top of said container is facing downwardly, and being pivotal back through said path to a third position in which the open front of said container is facing downwardly toward and registering with said second trackway for allowing said car to travel onto said second trackway, and means for joltingly shaking said container, when inverted, for shaking out the contents of such mold flasks.

References Cited in the file of this patent
UNITED STATES PATENTS

| | | |
|---|---|---|
| 2,229,492 | Christensen | Jan. 21, 1941 |
| 2,669,758 | Valyi | Feb. 23, 1954 |
| 2,798,267 | Anderson | July 9, 1957 |
| 2,806,265 | Jackson | Sept. 17, 1957 |
| 2,827,677 | Granath | Mar. 25, 1958 |
| 2,842,819 | Granath | July 15, 1958 |
| 2,859,498 | Reichert | Nov. 11, 1958 |